Figure 1:
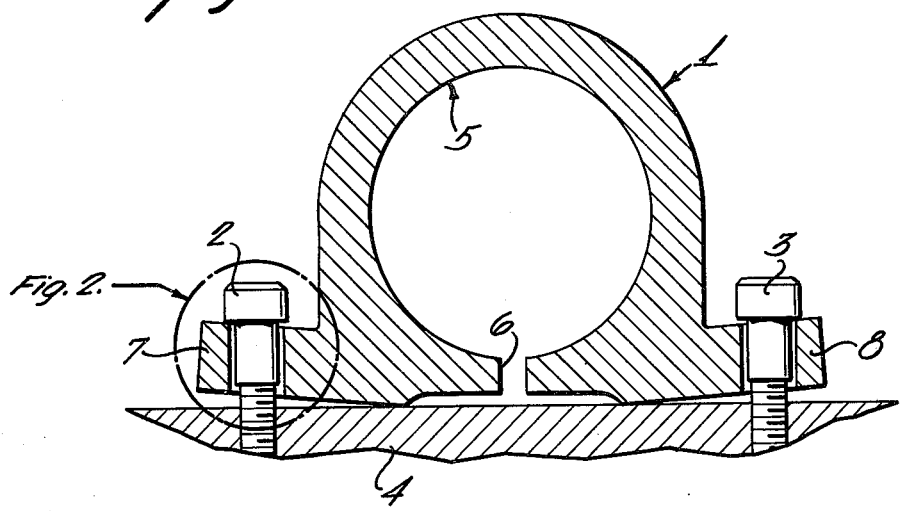

United States Patent [19]

Östling

[11] 4,136,914
[45] Jan. 30, 1979

[54] BEARING HOUSING
[75] Inventor: Sture Östling, Katrineholm, Sweden
[73] Assignee: SKF Nova AB, Goteborg, Sweden
[21] Appl. No.: 795,558
[22] Filed: May 10, 1977
[30] Foreign Application Priority Data
  May 21, 1977 [SE] Sweden .............................. 7605766
[51] Int. Cl.² .............................................. F16C 35/00
[52] U.S. Cl. ...................................... 308/15; 308/26; 308/31; 308/244
[58] Field of Search .................... 308/167, 179, 15, 23, 308/1 T, 31, 66, 244, 26; 248/74 R, 74 A, 74 B, 230, 251

[56] References Cited
U.S. PATENT DOCUMENTS

| | | | |
|---|---|---|---|
| 1,478,393 | 12/1923 | Livensparger | 308/23 |
| 2,897,017 | 7/1959 | Kubodera | 308/15 |
| 3,431,032 | 3/1969 | Haentjens | 308/15 |
| 3,493,280 | 2/1970 | Herbenar | 308/66 X |
| 3,893,734 | 7/1975 | Ulbrich | 308/167 X |
| 3,958,845 | 5/1976 | Nilsson | 308/31 X |
| 4,037,888 | 7/1977 | Mirjanic | 308/74 |

Primary Examiner—Stanley H. Tollberg
Assistant Examiner—Edward M. Wacyra
Attorney, Agent, or Firm—Eugene E. Renz, Jr.

[57] ABSTRACT

A bearing housing characterized by novel features of construction and arrangement providing an adjustable bearing seat. The housing has a longitudinal slot and mounting portions protruding at each side of the slot. Each of the mounting portions is provided with a support surface confronting a base which in the unloaded condition is disposed at an angle relative to the base. The angular relationship of the mounting portions to the base can be selectively varied by pressing the mounting portions against the base by fastening elements engaging through openings in the mounting portion and engageable in the base. The housing is elastically deformable and when so adjusted the width of the slot is selectively varied and thereby the diameter of the seat can be adjusted.

5 Claims, 3 Drawing Figures

BEARING HOUSING

The present invention refers to a bearing housing of the type specified in the preamble of claim 1 in the attached set of claims.

The principal field of use for such bearing housings is the mounting of adjustable linear bearings such as ball or roller bushings, but the invention is applicable also to bearing housings for other purposes.

A problem of adjustable bushings is to make possible a desired tightening in a simple manner. A plurality of different systems for making such tightening possible are earlier known. In most cases the bushing is provided with a longitudinal slot in order to make it possible to reduce its bore diameter when it is subjected to a contracting force. In order to bring about a contraction is it earlier known to design a surrounding bearing housing in two parts with a lower half and an upper half, which halves by means of tightening screws can be forced together against the bushing located between the halves. It is also known to surround the bushing with a slot-provided surrounding clamping member, e.g. a bearing housing, the width of the slot thereby being adjustable by means of particular set screws for obtaining the desired tightening.

The slotted outer race ring of the bushing proper is according to another known solution provided with particular set screws and it is further more known to provide a slotted bearing housing with external, adjustable clamping means, which act upon the bearing housing at both sides of the slot, whereby the use of screws, extending right through the slot can be avoided.

In cases where the outer race ring of the bushing is provided with set screws it is difficult or even impossible to adjust the bushing when it is mounted in a housing, and in cases where the bore diameter of the bearing housing is adjustable the housing is made in a complicated manner in several parts and/or provided with adjustment members, which will make the product more expensive and in most cases will include particular set screws.

The purpose of the present invention is to provide a bearing housing, which can be manufactured in a simple and cheap manner and by means of which a bearing located in the bearing seat can be easily adjusted without the need of providing the bearing or the bearing housing with particular members for accomplishing the adjustment.

This is achieved according to the invention with a bearing housing manufactured in accordance with the features specified in the attached claims.

Such a bearing housing comprises a few parts only which makes it easy to manufacture, mount and handle.

Figure 2:
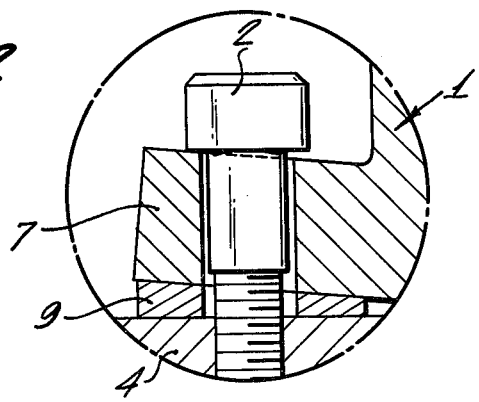
Figure 3:
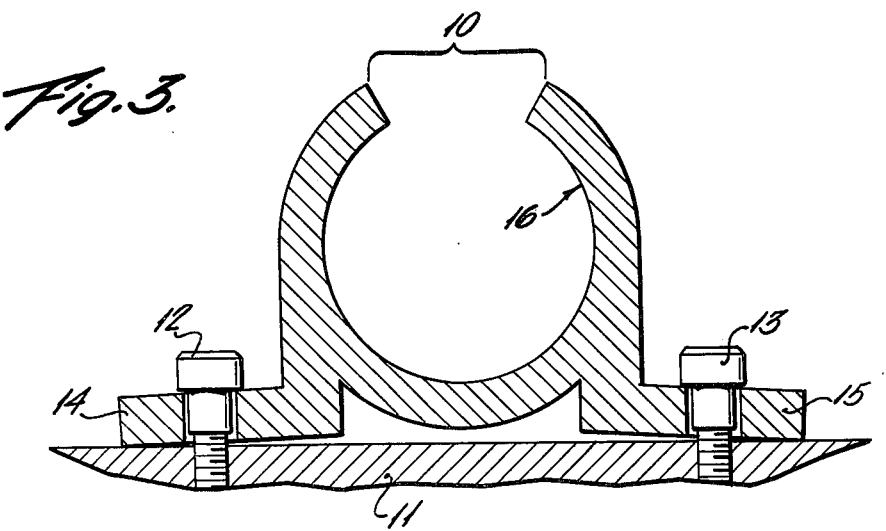

The invention will hereinafter be further described with reference to the accompanying drawing, in which:

FIG. 1 shows a section through a bearing housing according to an embodiment of the invention, FIG. 2 shows an alternative embodiment of a detail of a bearing housing according to FIG. 1, and FIG. 3 shows a section through a bearing housing according to another embodiment of the invention.

The bearing housing 1 shown in FIG. 1 is intended to be mounted to a base 4 by means of two screws 2 and 3. The housing has a mainly cylindrical bearing seat 5 and is provided with a longitudinal slot 6. At each side of the slot 6 the housing is provided with protruding mounting portions 7, 8 in the form of supports provided with holes through which the mounting screws 2, 3 extend.

The mounting portions 7, 8 are thus pressed against the base 4 when the screws are tightened. Each mounting portion is provided with a support surface turned against the base and when the mounting portions are not loaded, i.e. when the screws 2, 3 are not tightened each one of the support surfaces will form an angle against the base. The mounting portions are pressed against the base when the screws 2, 3 are tightened and said angle is hereby reduced. Strains will hereby arise in the bearing housing which is therefore deformed elastically in such a manner that the width of the slot 6 and thereby also the diameter of the bearing seat 5 will be reduced. By tightening the screws 2, 3 to a suitable degree it is possible to give the bearing seat a desired diameter, whereby it is possible to make a suitable adjustment of a bearing mounted in the seat.

It is desirable that the screws 2, 3 are allowed to be drawn so hard that the support surfaces of the mounting portions 7, 8 are pressed steadily against the base as this will guarantee a stable mounting of the bearing housing on the base. In order to make possible a free choice of the size of the diameter reduction of the bearing seat in the same bearing housing it is possible to use wedge-shaped supporting members, which can be introduced between the supporting surface of each mounting portion and the base. Such a supporting member is shown at 9 in FIG. 2 which figure in a larger scale shows the area encircled in FIG. 1. By suitable choice of the wedge-angle of the supporting members 9 it is possible in a simple manner to obtain as well the desired adjustment as a sufficiently stable attachment of the bearing housing.

In the embodiment shown in FIG. 1 the angles between the supporting surfaces and the base have their points turned against each other and the longitudinal slot 6 is situated between the mounting portions.

In FIG. 3 another embodiment of a bearing housing according to the invention is shown. The housing has a comparatively wide longitudinal opening 10 and it is fitted against a base 11 by means of screws 12, 13 which extend through mounting portions 14, 15. The opening 10 is situated diametrically opposite the base 11 and the angles between the supporting surfaces of the mounting portions 14, 15 and the base have their points turned from each other in such a manner that the house is deformed when the screws 12, 13 are tightened, in such a manner that the opening 10 and thereby also the diameter of the bearing seat 16 is reduced whereby a desired possibility of adjustment is obtained. The bearing housing according to FIG. 3 can for instance be used for receiving a linear bearing provided with a longitudinal opening, such as a ball or roller bushing intended for movement along a rail provided with a number of supporting legs, whereby the opening is arranged for enabling the bushing to pass said supporting legs.

Other embodiments of the invention than those hereabove described are of course possible within the scope of the appended claims. The base 10, 11 need for instance not be plain but can be designed in any suitable manner, e.g. if it forms part of a moveable machine member or if the shape of the member cannot be freely chosen. The material of the bearing housing is of course chosen in such a manner that it will comply with the requirements for strength and that it will be sufficiently elastic for making possible a desired deformation at adjustment. The mounting portions 7, 8 and 14, 15 can if desired be made of another material than the housing. The mounting portions can also be located in other manners than those shown in FIGS. 1–3, for instance diametrically at each side of the bearing seat. The bearing seat need not necessarily have a circular cross section but it can be adapted to different demands and to the field of use of the bearing housing. The bearing seat proper can if desired be designed as a bearing surface, in which case no particular bearing is mounted in the housing.

The invention can also be applied when it is desired to affix a member (a bearing housing) at a desired location on a longitudinal rail or the like, whereby the tightening will accomplish that a press fit is obtained between the housing and the rail.

I claim:

1. A one-piece bearing housing adapted to be mounted on a base member having a first support surface, said housing comprising a first section having an interior peripheral surface defining a bearing seat, a longitudinally extending slot, mounting portions protruding at each side of said first section, each mounting portion being provided with a second support surface, confronting said first support surface, which when not loaded is disposed at a predetermined angle relative to the first support surface, fastening means adapted to press said mounting portions against the base thereby to elastically deform the first section of the bearing housing whereby the width of the slot may be selectively adjusted and thereby the cross-section dimension of the bearing seat can likewise be adjusted.

2. A bearing housing as claimed in claim 1 wherein the interior peripheral surface defining the bearing seat is of generally circular cross section whereby the diameter of said seat is decreased when said fastening means are actuated in a direction to press said mounting portions against the base.

3. A one-piece bearing housing adapted to be mounted on a base member having a first support surface, said housing comprising a first section having an interior peripheral surface defining a bearing seat, a longitudinally extending slot, mounting portions protruding at each side of said first section, each mounting portion being provided with a second support surface, confronting said first support surface, which when not loaded is disposed at a predetermined angle relative to the first support surface, fastening means adapted to press said mounting portions against the base thereby to elastically deform the first section of the bearing housing whereby the width of the slot may be selectively adjusted and thereby the cross-section dimension of the bearing seat can likewise be adjusted and wedge shaped support members in the angular space between said first and second support surfaces.

4. A one-piece bearing housing adapted to be mounted on a base member having a first support surface, said housing comprising a first section having an interior peripheral surface defining a bearing seat, a longitudinally extending slot, mounting portions protruding at each side of said first section, each mounting portion being provided with a second support surface diverging outwardly from said first support surface and confronting said first support surface which when not loaded is disposed at a predetermined angle relative to the base, fastening means adapted to press said mounting portions against the base thereby to elastically deform the first section of the bearing housing whereby the width of the slot may be selectively adjusted and thereby the cross-section dimension of the bearing seat can likewise be adjusted.

5. A one-piece bearing housing adapted to be mounted on a base member having a first support surface disposed in a predetermined plane, said housing comprising a first section having an interior peripheral surface defining a bearing seat, a longitudinally extending slot in said first section and mounting portions extending from said first section on opposite sides of said slot, each mounting portion being provided with a second support surface, confronting said first support surface, which when not loaded converge outwardly toward said first surface at a predetermined angle, fastening means adapted to press said mounting portions against the base thereby to elastically deform the first section of the bearing housing whereby the width of the slot may be selectively adjusted and thereby the diameter of the bearing seat can likewise be adjusted.

* * * * *